United States Patent [19]

Loader

[11] 4,413,017

[45] Nov. 1, 1983

[54] FOOD PRODUCT CONTAINING JUICE PULP AND ACIDIFIED MILK COMPONENTS

[75] Inventor: Mary A. Loader, Minneapolis, Minn.

[73] Assignee: General Mills, Inc., Minneapolis, Minn.

[21] Appl. No.: 272,446

[22] Filed: Jun. 11, 1981

[51] Int. Cl.$^3$ .............. A23L 1/187; A23L 1/212; A23L 1/34; A23C 23/00

[52] U.S. Cl. .................. 426/616; 426/615; 426/639; 426/658; 426/583; 426/573; 426/577

[58] Field of Search .............. 426/616, 583, 584, 615, 426/639, 658

[56] References Cited

U.S. PATENT DOCUMENTS

| | | | |
|---|---|---|---|
| 2,818,342 | 12/1957 | Ransom | 426/584 |
| 2,858,221 | 10/1958 | Laurie | 426/616 |
| 2,859,118 | 11/1958 | Lewis | 426/616 |
| 2,865,757 | 12/1958 | Aurell . | |
| 2,952,548 | 9/1960 | Work . | |
| 3,174,865 | 3/1965 | Johnston et al. | 426/584 |
| 3,190,756 | 5/1965 | Aurell . | |
| 3,196,020 | 7/1965 | Work . | |
| 3,246,993 | 4/1966 | Webster | 426/616 |
| 3,625,702 | 12/1971 | Exler | 426/583 |
| 3,764,710 | 10/1973 | Inagami | 426/591 |
| 3,862,342 | 1/1975 | Maraulja et al. | 426/616 |
| 3,949,098 | 4/1976 | Bangert | 426/583 |
| 3,978,243 | 8/1976 | Pedersen | 426/583 |
| 3,996,390 | 12/1976 | Igoe | 426/583 |
| 4,031,264 | 6/1977 | Arolski | 426/584 |
| 4,061,792 | 12/1977 | Inagami et al. | 426/584 |
| 4,192,901 | 3/1980 | Yasumatsu et al. | 426/584 |
| 4,205,093 | 5/1980 | Blake | 426/616 |
| 4,212,893 | 7/1980 | Takahata | 426/584 |
| 4,232,049 | 11/1980 | Blake | 426/616 |
| 4,232,053 | 11/1980 | Blake | 426/616 |
| 4,244,981 | 1/1981 | Blake | 426/616 |
| 4,308,287 | 12/1981 | Kahn et al. | 426/583 |

FOREIGN PATENT DOCUMENTS

| | | | |
|---|---|---|---|
| 7117371 | 6/1972 | Netherlands | 426/584 |
| 588964 | 1/1978 | U.S.S.R. | 426/583 |

OTHER PUBLICATIONS

"Processing and Potential Uses for Dried Juice Sacs," by J. W. Kesterson and R. J. Braddock, Food Technology, Feb. 1972, pp. 52–54.

*Primary Examiner*—Steven L. Weinstein
*Attorney, Agent, or Firm*—Gene O. Enockson; John A. O'Toole

[57] ABSTRACT

Disclosed are food compositions having a fluid viscosity and texture similar to pudding, (i.e., a viscosity ranging between about 7,000 to 18,000 c.p. at 40°±2° F.). The food products essentially comprise, (A) from about 30% to 55% by weight of raw, washed juice pulp (wet basis); (B) from about 5% to 15% of an acidified milk product such as sour cream or yogurt (solids basis); (C) from about 5% to 15% of nutritive carbohydrate sweetening agent(s); (D) sufficient edible organic acid to provide the food composition with a pH ranging from about 3.0 to 4.5; and (E) sufficient water to provide a moisture content of about 65% to 85%. Preferred embodiments additionally comprise from about 5% to 20% fruit. The food products can be distributed either chilled or frozen.

14 Claims, No Drawings

FOOD PRODUCT CONTAINING JUICE PULP AND ACIDIFIED MILK COMPONENTS

BACKGROUND OF THE INVENTION

1. Field of the Invention

The present invention relates to food compositions having juice vesicles derived from citrus fruits as the basic ingredient.

2. The Prior Art

Certain waste materials are produced in the manufacture of juice from the fruit, particularly from citrus fruit. For years problems with the disposal of the waste fruit material have prompted attempts to utilize this waste material. Initial screening separates layer material such as peel and seeds from the juice. Generally, the layer material is dried, comminuted, and used for cattle feed. For citrus fruit, the peel material can be elaborately processed to provide purified pectin useful for jelly, jam and the like.

Finer materials (i.e., pulp) associated with the juice are similarly segregated from the juice by screening. A variety of terms have been loosely used in the art to refer to this pulp material or parts thereof in its various physical or processed forms. It has been called at various times in its untreated state, "juice vesicles," "juice sacs" or "finisher pulp." The juice vesicles are the membranes forming the juice sacs. During juicing operations, the juice sacs rupture and release their juice. Thus, for purposes of the present invention "juice vesicles" is used synonymously for the residual citrus juice sac materials remaining after the release of the juice from the juice sac.

In one typical commercial juice production, the pulp is washed to recover cold water soluble sugars which are present in the pulp material in dilute amounts. Although the cold water soluble sugars are initially present in relatively high concentrations on a dry solids basis, e.g., 30% by weight, on a wet basis the sugars concentration is quite low since the total solids' content of the finisher pulp is only 3% to 5%. Some pectin-like materials are also washed away along with the soluble sugars to leave a material dubbed "washed juice vesicles."

Large volumes of washed juice vesicles or pulp are produced as a result of the washing operations to recover the more valuable sugars. Virtually all the washed orange pulp, for example, is combined with other citrus waste material and used locally for cattle feed. Such a practice results in part from the high shipping costs due to the high moisture content of washed orange pulp which commonly ranges from about 12% to 98% by weight. Also partly responsible is the low level of assimilable carbohydrates due to the washing operations described above. Furthermore, the pulp is not a good source of pectin for extraction for commercial production compared to the peel. Accordingly, while potentially suitable for human consumption, juice pulp remains an under-utilized food material.

Numerous attempts have been made in the past to attempt to employ washed juice pulp as a food source for humans. Due to the storage and shippage problems associated with using washed juice pulp in its wet form, most past attempts have employed dried pulp (e.g., drum dried, solvent dried or spray dried). Such material has been called when derived from citrus fruits at various times citrus flour, dried juice sacs, and citrus fiber flour. Material of similar chemical composition but different physically which has been derived from drying citrus albedo has been called protopectin. Such suggested utilization is based upon the excellent water-binding and good-oil binding properties of the material. One reference (see "Processing and Potential Uses for Dried Juice Sacs," by J. W. Kesterson and R. J. Braddock, *Food Technology*, Feb. 1973, pp. 52–54) suggests its utilization in a wide variety of food products, but has no teaching of actual use in any food product.

However, notwithstanding such optimistic speculation concerning potential usage, difficulties have arisen in the practical efforts to utilize the dried juice vesicle material or protopectin material derived therefrom even in additive amounts. Several art efforts have been made at incorporating small amounts into breads or cakes of treated, dried protopectin derived from citrus residue including from dried juice vesicles (see U.S. Pat. No. 2,952,548 issued Sept. 13, 1960 to L. T. Work; U.S. Pat. No. 3,190,756 issued June 22, 1965 to W. Aurell; and U.S. Pat. No. 3,196,020 issued July 20, 1965 to W. Aurell). These patents disclose elaborately treating the dried protopectin with various lipids or colloid materials to decrease the rate or amount of hydration of the protopectins. Without such treatment, these patents teach that the rapid hydration of these extremely hydrophilic materials causes doughs or batters to set quickly into non-elastic solid masses which are unsuitable for bread or cake production. Alternatively, it has been taught that cakes containing small amounts or untreated dried protopectin can be realized by formulating doughs of low gluten flours such as potato flour. (See for example, U.S. Pat. No. 2,865,757 issued Dec. 23, 1958 to W. Aurell).

In some instances, the pulp is recovered and freeze-dried to be used in dry juice powders which form orange juice drinks when reconstituted with water (see, for example, U.S. Pat. No. 3,246,993 issued Apr. 19, 1966 to R. C. Webster et al.).

However, other efforts have been made to employ the washed orange pulp in its raw, i.e., undehydrated form. One early attempt prepared a frozen, popsicle-like dessert using major amounts of citrus pulp. (See U.S. Pat. No. 2,858,221 issued Apr. 19, 1966 to Webster et al.)

More recently, washed orange pulp has been added to intermediate moisture foods (see U.S. Pat. No. 4,205,093 issued May 27, 1980 to J. R. Blake). Also, washed orange pulp has been disclosed as being useful in a specially prepared comestible base involving controlled cooking of the citrus pulp in combination with other essential ingredients (see U.S. Pat. No. 4,232,053 issued Nov. 4, 1980 to J. R. Blake) and to non-dairy dessert compositions (see U.S. Pat. No. 4,244,981 issued Jan. 13, 1981 to J. R. Blake) each containing the comestible base. These patents recognize that irreversible changes in the juice pulp material occur upon conventional thermal dehydration. Thus, recent advances in the art of using these materials ditinguish between dried juice pulp material and "raw" or pulp material which has not been subjected to extensive heat treatment such as thermal dehydration.

Notwithstanding the state of the art as described above, however, there is a continuing need for food products for human consumption employing raw citrus juice pulp since most juice pulp remains a waste product.

One popular food item is yogurt, particularly fruit flavored yogurt. However, yogurt has several disadvantages. It is relatively high in calories. Also, the major ingredient, fresh whole milk, is relatively expensive. Additionally, yogurt must be distributed cooled (i.e., in a dairy case) since it is not freeze-thaw stable. Due to its distribution in a merely chilled state, yogurt has limited shelf stability. Moreover, yogurt is highly subject to light induced rancidity.

It would be desirable to make a product texturally similar to a product as familiar as pudding or yogurt using as a major ingredient under utilized materials such as juice pulp which presently is used only in minute quantities. Certain problems, however, unexpectedly arise in the realization of such products. One problem is the tendency of the raw juice pulp material itself to "clump" or to form a non-homogeneous mass. Still other problems arise when either fat sources or milk products are added to major amounts of juice pulp. In both the cases of fat(s) addition and milk products addition, a problem of "curdling" or "agglomeration" arises.

Accordingly, it is an object of the present invention to provide food products of reduced ingredient cost.

Another object of the present invention is to provide food products having high amounts of fiber.

Another object of the present invention is to provide food products which provide high satiety upon consumption.

Still another object of the present invention is to provide food products containing fat or milk ingredients that exhibit minimal curdling.

It has been surprisingly discovered that the above objectives can be realized and superior food compositions provided having a creamy consistency by formulating compositions containing major amounts of washed, raw homogenized juice vesicles or pulp. Such compositions additionally comprise an acidified milk product, a nutritive carbohydrate sweetening agent, and an acidulant.

Throughout the specification and claims, percentages and ratios are by weight and temperatures are in degrees Fahrenheit, unless otherwise indicated.

SUMMARY OF THE INVENTION

The present invention relates to food compositions employing major amounts of juice pulp in its original, hydrated form to realize snack or dessert compositions similar in texture and viscosity to pudding or a baby food. The food compositions employ from about 30% to 55% of raw juice pulp selected from the group consisting of citrus juice pulp, pineapple juice pulp, apple juice pulp and mixtures thereof.

The food compositions additionally comprise from about 5% to 15% of an acidified milk product and from about 5% to 15% of a nutritive carbohydrate sweetening agent.

The food compositions additionally include as essential components sufficient edible organic acid(s) to provide the food compositions with a pH ranging essentially from about 3.0 to 4.5 and sufficient water to provide a moisture content of about 65% to 85%.

Preferred embodiments additionally comprise from about 5% to 20% of diced fruit.

DETAILED DESCRIPTION OF THE INVENTION

The present invention relates to food compositions having a consistency similar to pudding or a baby food useful as a dessert or snack. The compositions essentially comprise (A) juice pulp; (B) an acidified milk product; (C) a nutritive carbohydrate sweetening agent; (D) sufficient edible organic acid to provide the food composition with a pH of between about 3.5 to 4.5; and, (E) a moisture source sufficient to provide the composition with a total moisture content of between about 65% to 85%. Preferred embodiments additionally comprise (F) fruit pieces. Each of these essential and preferred components as well as product preparation and use are described in detail below.

A. Juice Pulp

Homogenized, raw juice pulp (or "dejuiced juice vesicles") is the principal ingredient in the present food compositions. The essential raw juice pulp can be present at from about 30% to 55% of the food composition. Best results organoleptically are achieved when the juice vesicle ranges in concentration from about 42% to 47%.

As used herein, the term "raw juice pulp" refers to juice pulp whose water content has not been reduced by thermal and/or mechanical means. While the precise phenomenon is not understood, conventional food moisture reduction methods typically cause undesirable and irreversible degradation in the functionality of the juice pulp and thus renders them unsuitable for use herein. However, useful raw juice pulp can be heat stabilized against enzymatic deterioration. The juice vesicles can be stabilized by heating at 180° F. or higher for about 0.25 minutes in a closed container to prevent moisture loss.

Suitable juice pulp materials are selected from the group consisting of citrus juice pulp, pineapple juice pulp, apple juice pulp and mixtures thereof. These pulp materials are those derived from the screening of juices derived from citrus fruit, pineapple and apples to remove the pulp from the juice.

Highly preferred for use herein is citrus juice pulp, due to its low cost, ready availability and most importantly due to its relatively high soluble pectin content. Such water soluble pectin aids the structuring of the present food compositions. Suitable citrus pulp can be derived from any citrus fruit. Exemplary citrus fruits include oranges, lemons, grapefruit, tangerines, and mandarins. Of course, citrus pulp which is a mixture derived from more than one citrus fruit is contemplated for use herein. Preferred citrus pulp is derived from oranges, mandarins, tangerines and mixtures thereof. Most preferred is orange citrus pulp.

In the following disclosure, although citrus juice pulp is specifically described, it should be recognized that other juice pulp can also be usefully employed.

Employment of juice pulp enables the realization of food compositions providing high satiety due to its bulk and water holding properties. Additionally, since juice pulp is high in crude fiber (e.g. 33% by weight (dry) for citrus pulp), the present compositions beneficially contain high amounts of fiber compared to yogurt or puddings.

Raw juice pulp available from commercial juicing operations is typically "washed." As described above, in juicing operations, the pulp is washed one or more times in cold water to recover soluble sugars. "Washed," raw juice pulp as used herein, therefore refers to pulp having less than about 1% (wet basis) of water soluble sugars. Both washed and unwashed juice pulp is highly suitable for use herein.

Frozen washed, raw citrus pulp is available in bulk and can be used herein. In a preferred embodiment of the present invention, the frozen citrus pulp is comminuted or "hydroflaked" to speed thawing. Hydroflaking merely involves chopping the frozen pulp into smaller pieces. It is speculated that this hydroflaking modestly aids in the destruction of pulp cells which aids the provision of a smooth finished product. Conventional apparatus, e.g., Hydrauflaker manufactured by General Machines Corp. (Model No. F/S/100) and techniques can be used to hydroflake the frozen citrus pulp.

Thereafter, the hydroflaked citrus pulp is thawed. Any conventional apparatus and techniques can be used to thaw the citrus pulp. The citrus pulp can be thawed by mere tempering at room temperature, e.g., 65° F. to 75° F. While suitable, such a thawing technique is time consuming. Accelerated thawing techniques can also be employed. Thus, for example, the hydroflaked, frozen citrus pulp can be charged to a jacketed mixing vessel and heated with agitation to thaw within about 30 minutes with low pressure steam (15 lbs).

The thawed citrus pulp can be used in simple admixture with the other essential and optional ingredients of the present food compositions.

In a highly preferred embodiment of the present food compositions, it is desirable to employ homogenized juice vesicles. Homogenized juice pulps are preferred since the food compositions realized thereby desirably exhibit a creamy, smooth texture. Moreover, undesirable "clumping" of the juice pulp ingredient is minimized when homogenized juice pulp is used.

Homogenized juice pulp can be prepared using conventional homogenization methods and apparatus. Generally, homogenizers are divided into two groups according to the kind of energy introduced into the medium homogenized: (1) rotor or rotor-stator systems, e.g., agitators, emulsifying pumps and colloid mills, and (2) pressure systems, e.g., wedge resonators and pressure homogenizers. The pressure homogenizers are predominantly used in food processing since they have the best homogenizing effects. Preferably, such units which are used in the preparation of the homogenized juice vesicles, usefully employed in the present compositions, are those homogenizers which are constructed to prevent contamination. Typically, juice vesicles are easily homogenized employing wide ranges of homogenization pressures, e.g., 1,000 to 8,000 p.s.i.g.

Unfortunately, homogenized juice vesicles are not readily amenable of analysis of their particle size distributions due to their partially dissolved/suspended nature and their high viscosity. Sufficient homogenization for the present invention is achieved, however, when the homogenized juice vesicles' taste perception is particle free or homogeneous, e.g., similar texturally to catsup.

Highly preferred for use herein is juice pulp which has been homogenized by a two-pass homogenization step. In the first pass of this homogenization step, the juice pulp is homogenized in a conventional two stage homogenizer at about 500 psi in the first stage and about 3,000 to 7,000 psi in the second stage. Thereafter, the juice pulp undergoes a second, two stage homogenization pass at 500 psi in the first stage of the two stage homogenizer and 5,000 to 8,000 psi in the second stage. Such highly homogenized juice pulp has an exceptionally desirable creamy texture.

It has been found that homogenized juice pulp which has been homogenized at lower homogenization pressures within the ranges given herein when combined immediately with the other ingredients herein yield food products having a slightly gritty texture. However, if the juice pulp is allowed to rest for from three to seven days (room temperature) that the resultant food products exhibit the highly preferred creamy texture.

B. Acidified Milk Component

An acidified milk product is an essential ingredient in the present food compositions. The acidified milk product generally essentially comprises from about 5% to 15% (dry basis) of the food compositions. For best results, the food composition should contain from about 11% to about 13% of the acidified milk component.

Suitable acidified milk components include all milk products having a titratable acidity of not less than 0.5% expressed as lactic acid. "Acidified milk products" as used herein is defined as referring to those milk products which result from the souring of dairy products by lactic acid producing bacteria or with suitable acidifiers or both.

A surprising benefit of the present invention is that the lactose sugar level is very low even though milk products are an essential ingredient herein. It is believed that such a result stems from bacterial metabolism of the lactose sugar to generate the lactic acid. Accordingly, the present food products may have utility for use by those suffering from lactose intollerance.

Useful acidified milk components can be derived from bovine milk products of varying weight concentrations of butterfat, e.g., skim milk, whole milk, cream, and mixtures thereof. Reconstituted milk products can also be used. Thus, the present acidified milk component includes acidified low fat milk, i.e., containing not less than 0.5% nor more than 2.0% milk fat and not less than 8.25% milk solids-not fat; acidified skim milk, cultured skim milk, sour cream, acidified sour cream, sour "half-and-half" ("half-and-half" as defined in 21 Code of Federal Regulations 131.130 is the food consisting of a mixture of milk and cream which contains not less than 10.5% but less than 18% milk fat), acidified sour half-and-half, yogurt, including low fat yogurt and nonfat yogurt. Preferred acidified milk components are selected from the group consisting of sour cream, acidified sour cream, sour half-and-half, acidified sour half-and-half, yogurt, low fat yogurt, and mixtures thereof. Sour cream is the preferred acidified milk component for use herein.

The natural pH of the juice pulp is low, about 4.2 to 4.5. Additionally, the present essential pH range has been found to be important to the stability of the shelf life of the present compositions and the stability of the fruit components of certain preferred embodiments herein. While it would be desirable to include a fatty component herein to provide the desirable mouthfeel and other recognized benefits of fatty components, it has been found that the low acidity of the present food compositions undesirably result in curdling or agglomeration of these fat sources. It has been surprisingly discovered, however, that provision of the fat component by inclusion of a high fat milk component previously acidified such as sour cream or sour half-and-half as the fat source desirably eliminates this curdling or agglomeration problem.

Similarly, it would be desirable to include milk-based ingredients to the present food compositions. However, the inclusion of such ingredients similarly results in the undesirable curdling or agglomeration problem. It has been also surprisingly discovered that the problems of curdling and agglomeration can be minimized by the addition of these milk ingredients in the present form. While not wishing to be bound by the proposed theory, it is speculated herein that the gradual reduction in the pH from its natural levels occasioned by the culturing of these milk-based products stabilizes the protein-based fat globules against curdling upon addition to the relatively acidic food compositions of the present invention.

C. Sweetening Agent

A nutritive carbohydrate sweetening agent is essentially present in the present food compositions at about 5% to 15%, preferably at from about 8% to 10%, and most preferably at about 9%. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate and the like. Additionally, the present carbohydrate sweetening agents are to be distinguished from such protein-based sweetening agents as aspartame, thaumatin and monellin.

Suitable materials for use as nutritive carbohydrate sweetening agents are well known in the art. Examples of sweetening agents include both monosaccharide and disaccharide sugars such as sucrose, invert sugar, dextrose, lactose, high D.E. corn syrups, and maltose. Preferred nutritive carbohydrate sweetening agents are those selected from the group consisting of sucrose, dextrose and mixtures thereof. Sucrose is the best sweetening agent for use herein. Of course, mixtures of the above-noted materials are contemplated herein.

While still suitable, certain conventional sweetening agents exhibit a modest reduction in sweetness upon extended storage when included in the present food compositions. Generally, these agents are aqueous solutions of fructose-type sugars including conventional high fructose corn syrup, honey, and maple syrup. In highly acidic, aqueous mediums—which include the present food—these sugars can undergo some undesirable degradation. Thus, when used herein, these sugars are preferably used in mixtures with other sugars such as sucrose.

D. Acidulant

An edible non-volatile organic acid is another essential ingredient of the present food composition. The edible organic acid serves to provide the compositions with a pH of from about 3.0 to about 4.5, preferably from about 3.3 to 3.7 and most preferably about 3.5. Maintenance of the pH of the present compositions within the above-noted range provides additional stabilization against microbial attack. Typically, edible organic acids are employed at levels of from about 0.3% to 0.6% of the present food compositions.

A wide variety of edible organic acids or their salts are known in the food art and are usefully employed herein. Examples of suitable materials useful herein as edible organic acids include citric acid, succinic acid, tartaric acid, malic acid, acetic acid, lactic acid, itaconic acid and adipic acid and their water soluble salts. The cation of the salts of such edible organic acids can be sodium, potassium and the like. Better results in terms of product stability are obtained when the acids themselves are employed. Preferred edible organic acids include citric acid, malic acid, tartaric acid and mixtures thereof. Citric acid is the most highly preferred acid for use herein.

E. Moisture Content

The present food products have a moisture content which essentially ranges from about 65% to 85%. That is, the total solids level of the present food products ranges from about 35% to 15%. Superior results are obtained when the water content ranges from 75% to 85%. For best results, the moisture level should range between 77% to 81% by weight. Maintenance of the water content within the specified ranges is important to the realization of food products having a pudding-like consistency, i.e. having a viscosity ranging from about 7,000 to 18,000 c.p.s. (40° F.±2° F.). To some extent, the moisture content influences the textural properties of the present food products. Generally, those food products with higher moisture contents exhibit lower viscosities, while lower moisture content food compositions exhibit creamier characteristics.

Control of the moisture content can be obtained by limiting the amount of total water supplied to a given formulation. Pure water, e.g., potable water or distilled water, of course, is suitable. However, other water sources can be employed to ensure that the present food compositions have moisture contents within the above-recited range. For example, all manner of single or even multiple strength fruit juices can be used to supply requisite moisture as well as sweetening agents.

F. Optional Ingredients

The present food compositions can optionally contain a variety of additional ingredients suitable for rendering such products more organoleptically acceptable, more nutritious and/or more storage stable. While not essential to the present food compositions, such optional components include starches, hydrophilic colloids, fiber materials, artificial flavors, coloring agents, vitamins, preservatives, emulsifiers, and the like. If present, such materials are used at conventional levels.

Miscellaneous Fruit Material

In one highly preferred embodiment of the present invention, the food compositions additionally comprise an essential ingredient from about 5% to 20% of whole fruit flesh. Such materials give flavor and color when the present food compositions are prepared below as well as contributing to fiber, freeze-thaw stability and viscosity. Better results are achieved when the fruit material is present at from about 10% to 12% by weight.

Suitable fruit pieces are obtained from any flesh of the fruit. Examples of such fruits include pineapples, lemons, oranges, peaches, pears, grapes, mangos, apples, tomatoes, bananas, plums, blueberries, raspberries, strawberries, blackberries, currents, cherries, and mixtures thereof. Preferred fruits are selected from the group consisting of strawberries, pineapple, cherries, blueberries, raspberries, and mixtures thereof. Fresh fruit is, of course, highly preferred for preparing fruit pieces for use herein. However, previously frozen fruit is also suitable for use herein.

The particle size of the fruit material is not critical. Thus both diced fruit pieces, e.g., through a size 4 U.S. Standard Size sieve, as well as fruit purees are useful herein. Those fruit materials conventionally employed in the provision of sundae-style yogurt are also suitable. Such fruit materials are well known and the skilled artisan will have no problems selecting such suitable fruit material.

Food Product Preparation and Use

The food products of the present invention are prepared by admixing the essential and optional ingredients together in such a manner as to produce a cohesive mass.

In one preferred embodiment, all the essential and optional ingredients except for the fruit pieces are admixed and thereafter homogenized, e.g., in a two-stage homogenizer at 500 psi in the first stage and at 750 to 1500 psi in the second stage, to form a homogenized base. Thereafter, the fruit pieces are admixed to the homogenized base to realize this preferred embodiment. Such a method of preparation realizes a product having superior stability and homogeneity.

Thereafter, the food product whether or not homogenized is heat "pasteurized" at between about 180° F. to 190° F. for about 3 to 4 minutes. Pasteurization is necessary because even citrus pulp that has been heat stabilized against enzymatic deterioration contains numerous active bacteria. Preferably, the heated food composition is hot filled into suitable containers, i.e., filled while still hot, i.e., about 170° F. Hot filling additionally aids shelf stability. Suitable containers include, for example, conventional containers such as plastic tubs or cups, or film coated paper cartons.

Thereafter, the packed food compositions can be stored and distributed through dairy case distribution channels. Also, the packaged food composition products herein can be stored and distributed in a frozen state.

The food products of the present invention are illustrated by the following examples:

EXAMPLE I

A strawberry flavored food composition of the present invention is prepared having the following composition:

| Amount | Ingredient | Weight % |
|---|---|---|
| 128.40 lbs. | Homogenized orange juice pulp (95% water) | 42.80% |
| 33.55 | Sour cream[1] | 11.85 |
| 34.17 | Strawberries[2] | 11.80 |
| 27.21 | Sucrose | 9.07 |
| 0.81 | Citric Acid | 0.27 |
| 66.99 | Water | 22.33 |
| 6.00 | Raspberry Juice Concentrate (45° Brix)[3] | 2.00 |
| 0.57 | Flavors | 0.19 |
| 300.00 lbs. | | 100.00% |

[1]Fermented sour cream having a moisture content of 57%, a butterfat content of 37.6% and a non-fat solids content of 5.4%.
[2]"4 plus 1" strawberries, i.e., four parts strawberry pieces to one part sucrose to preserve color upon freezing in cooled temperature shipping.
[3]a natural source of food colorant.

The moisture content of the present food composition is measured to be about 79%. The pH of the composition was measured to be 3.5.

The food composition is prepared by chopping frozen blocks of washed, raw orange juice pulp in a Hydrauflaker. Thereafter, the chopped frozen pulp is thawed at 70° F. The completely thawed pulp is then homogenized in a two-stage homogenizer in a first pass at 500 psi, first stage, and at 3,000 psi, second stage. The pulp is then given a second pass at 500 psi first stage, and 5,500 psi second stage. The homogenized washed orange pulp was allowed to stand 4–7 days at 40° F. prior to use.

The ingredients are then weighed and added directly to a steam jacketed, swept surface 50 gal. kettle and allowed to mix for 10 minutes. Steam is introduced to the jacket to heat the mixture to 190° F. for 3 minutes and is pumped to a filler for packaging and then is packed in plastic cups.

Food compositions of similar physical and organoleptic properties could be realized when in the Example I composition the washed orange juice pulp is replaced with an equivalent amount of pineapple juice pulp, apple juice pulp and mixtures thereof.

EXAMPLE II

A food composition of the present invention having fruit pieces as an ingredient is prepared having the following composition:

| Ingredient | Weight % |
|---|---|
| Grapefruit juice pulp[1] | 42.87 |
| Water | 22.06 |
| Yogurt[2] | 11.70 |
| Pineapple chunks[3] | 11.26 |
| Sucrose | 5.85 |
| Dextrose | 3.00 |
| Flavors | 3.00 |
| Citric Acid | 0.26 |
| | 100.00% |

[1]Raw juice pulp having a moisture content of 90%.
[2]Having a moisture content of 88%, a fat content of 2.8% and a non-fat solids content of 9.2%.
[3]Apx. ⅛ to ¼ in. chunks.

The food composition is calculated to have a moisture content of 80% while the pH is measured to be 3.5.

The food composition is prepared in a manner similar to that of Example I except that the chopped, frozen grapefruit juice pulp is thawed in a steam jacketed paddle conveyor with 10–15 psig steam and directly homogenized at (1) 500 psi; 6,000 psi and (2) 500 psi; 6,600 psi, respectively.

The homogenized pulp is then mixed, without waiting, with the other ingredients including the pineapple chunks, heated and packaged as in Example I.

Compositions of similar physical and organoleptic properties are realized when in the composition the yogurt is replaced with an equivalent amount of sour half-and-half or low-fat yogurt.

EXAMPLE III

A food composition of the present invention is prepared having the following composition:

| Ingredient | Weight % |
|---|---|
| Orange juice pulp[1] | 44.91 |
| Water | 22.32 |
| Sugar | 11.84 |
| Sour half-and-half[2] | 11.38 |
| Diced peaches | 9.11 |
| Malic Acid | 0.27 |

-continued

| Ingredient | Weight % |
|---|---|
| Flavors | 0.07 |
| Salt | 0.04 |
| Colors | 0.01 |
| | 100.00% |

[1] Having a moisture content of 93% and a sugar content of about 1% (wet basis).
[2] Bacterially acidified milk product having a moisture content of 79%, a butterfat content of 11.7% and non-fat milk solids of 10.3%.

The food composition is calculated to have a moisture content of 82% while the pH is measured to be 3.5.

The food composition is prepared in a manner similar to that of Example I and II. The washed, raw orange juice pulp is heat stabilized against enzymatic degradation by heating to 180° F. for at least 0.25 minutes. Thereafter, the orange juice pulp is homogenized in a single pass in a two-stage homogenizer at 500 psi and 8,000 psi. The homogenized juice pulp is then directly admixed with the other essential and optional ingredients.

What is claimed is:

1. A food composition having a pudding-like texture consisting essentially of a pasteurized, uniform blend of:
   A. from about 42% to 55% by weight (wet basis) is dated, washed, homogenized raw juice pulp whose water content has not been reduced by thermal and/or mechanical means;
   B. from about 11% to 15% of sour cream on a solids basis;
   C. from about 5% to 15% by weight of a nutritive carbohydrate sweetening agent;
   D. sufficient edible organic acid to provide the food composition with a pH of about 3.0 to about 4.5; and
   E. sufficient moisture to have a water content ranging from about 65% to 85% by weight; and wherein said blend has a viscosity of 7,000 to 18,000 cp. at 40°±2° F.

2. The food composition of claim 1 wherein the juice pulp is selected from the group consisting of citrus juice pulp, pineapple juice pulp, apple juice pulp, and mixtures thereof.

3. The food composition of claim 2 wherein the juice pulp is citrus juice pulp.

4. The food composition of claim 3 wherein the citrus juice pulp is selected from the group consisting of grapefruit juice pulp, orange juice pulp, mandarin juice pulp, tangerine juice pulp, and mixtures thereof.

5. The food composition of claim 4 wherein the food composition is homogenized.

6. The food composition of claim 4, additionally comprising:
   from about 5% to 20% by weight of whole fruit.

7. The food composition of claim 6
   (a) wherein the juice pulp is present at from about 42% to 47% by weight,
   (b) wherein the sour cream is present from about 11% to 13% by weight,
   (c) wherein the sweetening agent is present at from about 8% to 10% by weight,
   (d) wherein the organic acid is present in sufficient amounts to provide the composition with a pH of about 3.5 to 4.3,
   (e) wherein the moisture content ranges from about 75% to 80% by weight.

8. The food composition of claim 7 wherein the juice pulp has been homogenized in a two-pass homogenization step wherein the first pass pressure ranges from about 3,000 to 7,000 psi, and the second pass ranges from about 5,000 to 8,000 psi.

9. The food composition of claim 8 wherein the sweetening agent is selected from the group consisting of sucrose, invert sugar, dextrose, lactose, maltose, and mixtures thereof.

10. The food composition of claim 9 wherein the acid is selected from the group consisting of citric acid, malic acid, tartaric acid, and mixtures thereof.

11. The food composition of claim 10 wherein the juice pulp is orange juice pulp.

12. The food composition of claim 11 wherein the sweetening agent is sucrose.

13. The food composition of claim 12 wherein the acid is citric acid.

14. The food composition of claim 13 wherein the fruit are selected from the group consisting of strawberries, pineapple, cherries, blueberries, raspberres, and mixtures thereof.

* * * * *

UNITED STATES PATENT AND TRADEMARK OFFICE
CERTIFICATE OF CORRECTION

PATENT NO. : 4,413,017

DATED : November 1, 1983

INVENTOR(S) : Mary A. Loader

It is certified that error appears in the above-identified patent and that said Letters Patent are hereby corrected as shown below:

Col. 5, line 54 -- After amenable, "of" should be -- to --.

Col. 8, line 2 -- "cation" should be -- cations --.

Col. 11, lines 26 & 27 -- "is dated" should be -- isolated --.

Col. 12, line 44 -- "raspberres" should be -- raspberries --.

Signed and Sealed this

Twenty-first Day of February 1984

[SEAL]

Attest:

GERALD J. MOSSINGHOFF

Attesting Officer

Commissioner of Patents and Trademarks